Jan. 21, 1941.  J. A. ZUBLIN  2,229,538
METHOD OF PRODUCING OIL AND GAS FROM A WELL
Filed May 1, 1939  2 Sheets-Sheet 2
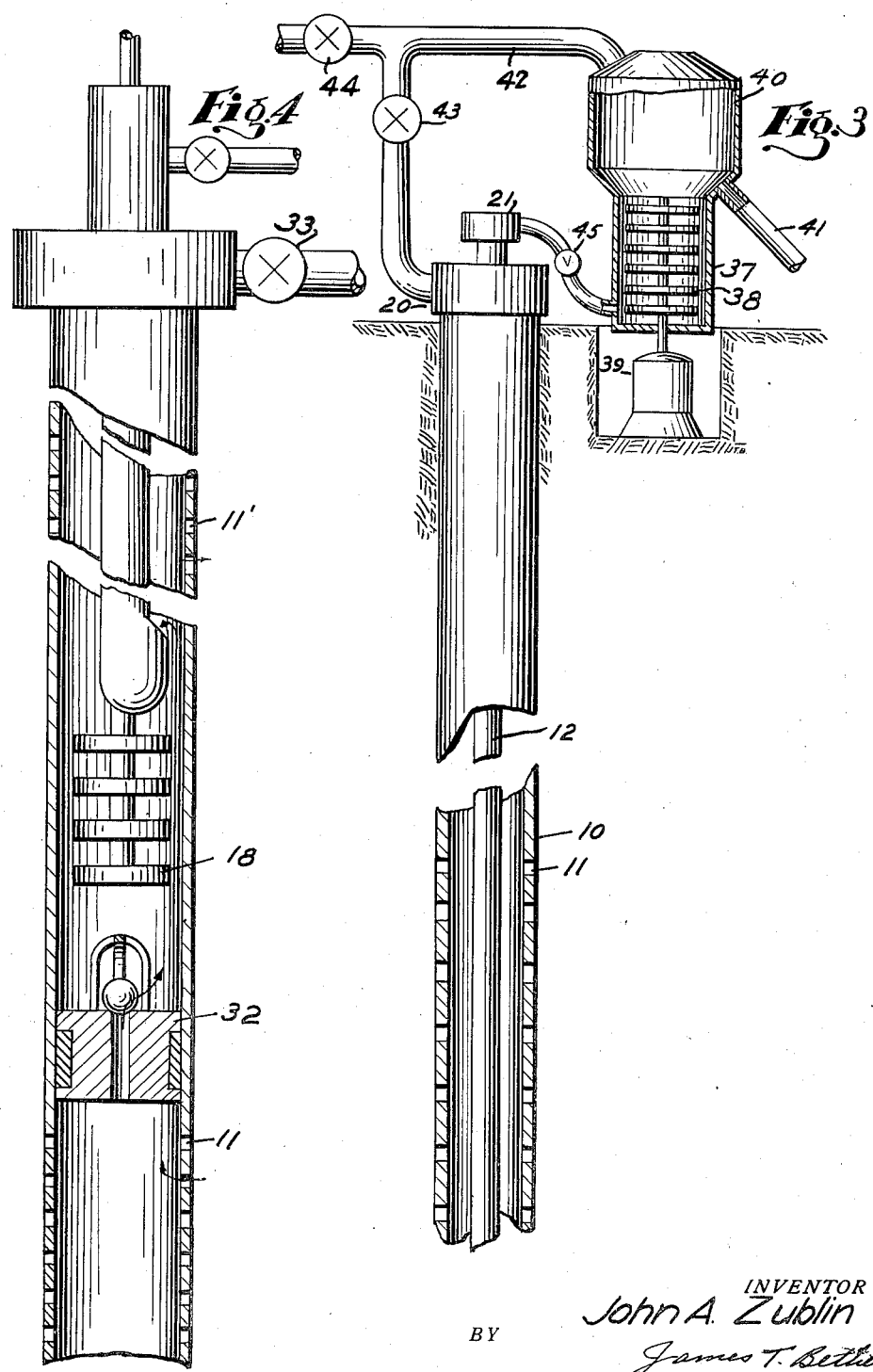
INVENTOR
John A. Zublin
BY James T. Bethell
ATTORNEY
Agent Patented Jan. 21, 1941

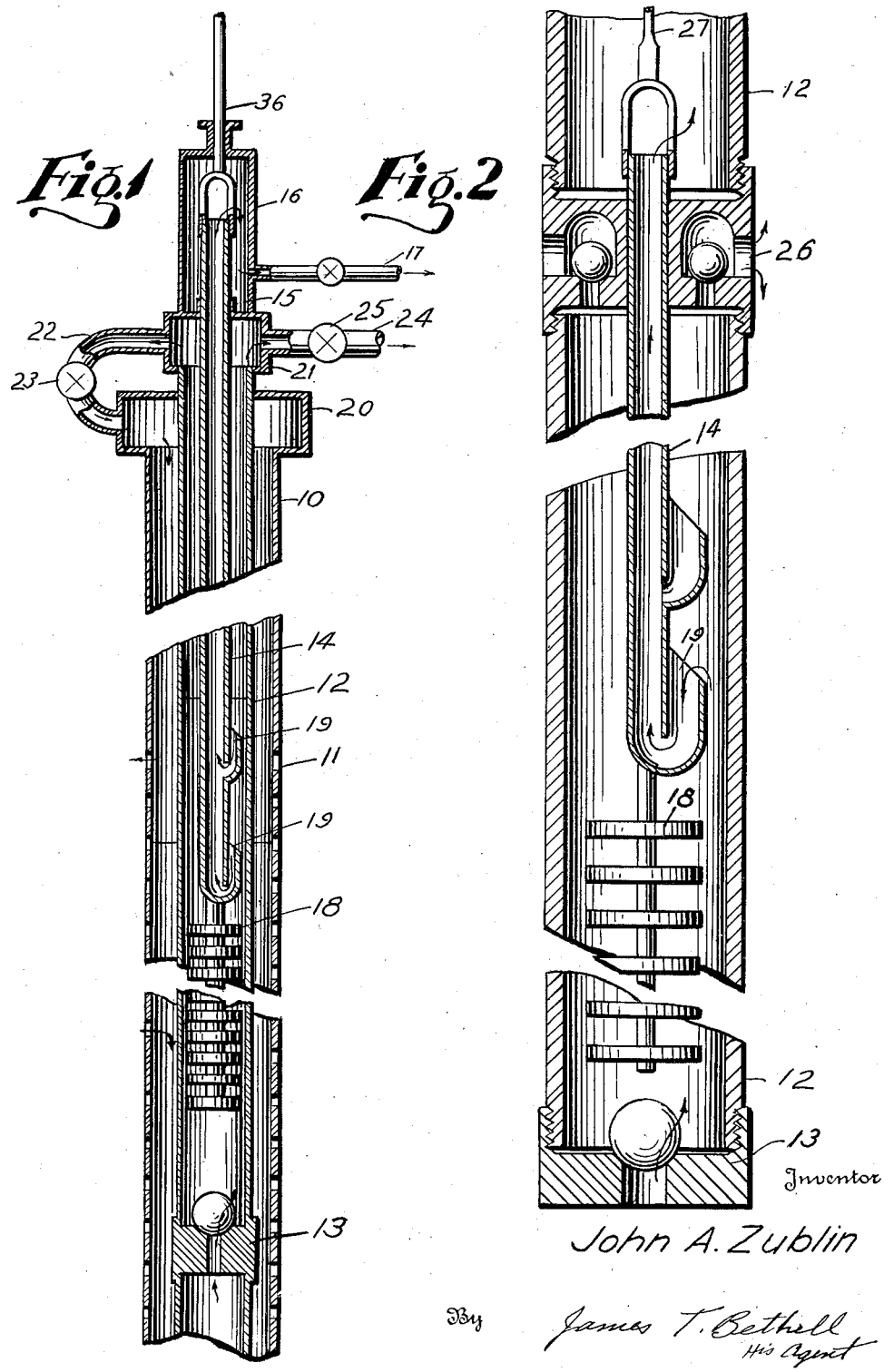

2,229,538

UNITED STATES PATENT OFFICE 2,229,538

METHOD OF PRODUCING OIL AND GAS FROM A WELL

John A. Zublin, Los Angeles, Calif.

Application May 1, 1939, Serial No. 271,227

3 Claims. (Cl. 166—21)

This invention relates to the production of petroleum, more particularly, to the production of petroleum from flowing wells.

The modern operation of oil wells, aiming at the most efficient utilization of oil deposits, has evolved the technique of repressuring the formation; that is to say, of the gas and oil driven to the surface, at least part of the gas is returned to the formation, to make available more of the oil in the formation, and to delay the time when pumping must be resorted to in order to lift the oil to the surface. The usual method achieving this result is by separation of the oil gas mixture as delivered to the surface, at comparatively low pressures, and recompression of the gas. The gas is then driven into an intake well, from whence it finds its way into the formation, thus driving oil to the producing well.

Another method of conservation of the gas pressure in the formation is that outlined in my Patent No. 2,005,767, granted June 25, 1935, for a "Method and apparatus for operating oil wells." The method there involved consists of separation of the oil and gas by passing it through a sort of centrifugal separator, the velocity of its passage being such to operate the separator and allow the separated gas to flow back into the formation.

The difficulties inherent in all types of repressuring operations are very great. Some of these difficulties are set by the geological nature of the formations which produce gas and oil. As examples, the pressures underground in a formation flowing gas and oil are of the order of several thousands of pounds. Further, the pressure which will force the gas into the formation may be greater than that delivering oil to the well. It may also happen that the pressure involved is much less. Further, it may be desired to return the gas to a different formation, in the producing well, from that which is flowing oil and gas to the well. Variations in the pressures, both of the producing formation and of the formation receiving the gas, from time to time, entail adjustments which cannot be readily made in the conventional apparatus.

In the operation of my patented separator, there are several inherent limitations in the structure. As the efficiency of the separation depends upon the velocity of the oil gas mixture up the eduction tube, and the best utilization of the oil, from the point of view of conservation, is dependent upon the flow, it may often happen that control of the flow at the surface by the Schaffer valve is not adequate to give the overall efficient withdrawal of oil and gas desired. Furthermore, there is no agitation at all during periods of no flow.

In the patented apparatus there is a definite limit to the pressures obtainable by the gas upon agitation of the gas oil mixture. This pressure may not be sufficient, in some cases, to return the gas to the formation.

There is a further limitation, in that the amount of gas released by agitation which is dependent upon the flow of the gas oil mixture has its quantity limited by the amount of energy available during the rise of the gas oil mixture through the agitator.

In the patented device there is no means for controlling the gas pressure except by controlling the flow of the gas and oil up the eduction tube. Control of this nature unavoidably results in loss of efficiency at some point or the other, as for example, in the agitator, or in the utilization of the oil existing in the formation, or elsewhere.

With the above limitations on the operation of wells flowing gas and oil, it becomes a general object of my invention to improve the gas oil ratio of a well.

It is a further object of my invention to provide means for agitation which are independent of the flow of the gas, oil or gas oil mixture.

It is a further object of my invention to increase the pressure of the gas and oil within the tubing to a pressure above the formation gas cap pressure by the agitation of the gas and oil with energy supplied from the surface of the ground.

It is a further object of my invention to provide a means of regulation of the gas pressure of the gas being recycled in the operation of the well.

It is a further object of my invention to build up the pressure caused by agitation of the gas oil mixture to a pressure above that of the gas in the casing.

It is a further object of this invention to separate a larger proportion of the gas from the oil by mechanical agitation than can be done by self agitation.

It is a further object to lift the oil to the surface by gas pressure, obtained by separating the gas and oil, with minimum contribution to the lift of gas flowing up the eduction tube.

It is a further object of my invention to utilize the agitating means for performing part of the lifting function in bringing the oil to the surface.

It is a further object of my invention to enable the utilization of the gas separated from the oil for the repressuring of different formations, in the same well, from the formation producing the oil and gas.

It is a further object of my invention to provide a gas pressure in the released gas for use in self-repressuring of wells.

It is a further object of my invention to attain the repressuring of formations, either in the same well or in different wells, which require a higher pressure for repressuring than is obtainable by self agitation of the gas oil mixture.

It is a further object of this invention to mechanically agitate the gas and oil.

Briefly, what I propose to do is to provide means whereby the oil may be agitated by mechanical agitators at the surface of the ground or driven by energy derived from the surface. Further, by the constructions illustrating my invention, I propose to accomplish the above objects in a manner as will readily become apparent as the description proceeds.

In the drawings,

Figure 1 represents one form of my device, more or less diagrammatic.

Figure 2 is a modification of the oil separating and agitating device shown in Figure 1.

Figure 3 is a modification of the device of Figure 1.

Figure 4 illustrates still another modification of the device shown in Figure 1.

Referring to Figure 1, the well casing is represented by 10, and has the usual perforations 11. Within this casing is a long string of tubing 12, closed at the bottom by the standing valve 13, permitting flow in an upward direction only. Extending through this tubing is a string of small tubing 14. This small tubing passes through a packing 15 between it and the outer tubing. At the upper end of the small tubing 14 is mounted a device 16 to permit free passage of fluid from the small tubing to a pipe 17. The part 16 is in effect a cylinder with packing at both ends, through which the tube 14 is free to reciprocate.

At the lower end, the small tubing has mounted thereon a series of agitators, of any suitable form, illustrated by 18. These agitators may be so formed that upon reciprocation of the small tubing they exert a violent churning effect on the contents of the outer tubing 12.

The agitators may also be formed with comparatively small clearances with the wall of the outer tubing 12, which will give an agitating motion to the contents of the outer tubing between the agitators and the tubing.

Near the lower end of the small tubing 14 are formed openings 19, 19, preferably of the form illustrated, for a purpose presently to appear.

At the upper end of the casing is a casinghead 20, and at the upper end of the outer tubing is a tubinghead 21, both of conventional design, the casinghead preventing the passage of gas between the casing and the outer tubing, the tubinghead 21 containing the packing 15 referred to above, and having mounted thereon the device 16 referred to.

Communicating between the tubinghead and the casinghead are the pipes 22, equipped with the gas valves 23. From one or more of the gas pipes 22 there is a pipe 24 equipped with a valve 25. The small tubing is reciprocated by the rod 36, connected thereto, passing through cylinder 16 and driven by any suitable reciprocating mechanism.

The operation of my device should now be clear. The mixture of gas and oil delivered by the well rises in the outer tubing past the standing valve 13 to a height determined by the depth at which tubing 12 is set in the casing. Under conditions of operation this establishes a hydrostatic head between the level of the fluid in the casing and the equivalent level in the tubing 12, which will be below the foam level in the tubing 12, causing the oil and gas mixture to be delivered through the standing valve 13 to the tube 12. The agitating means 18, actuated by the reciprocation of the small inner tubing 14, exerts a churning effect upon the oil gas mixture, which causes a great increase in the volume of the gas associated with the oil. The oil and gas separate, the gas rising to the top of the outer tubing 12, and the oil settling to the bottom of the outer tubing. The pressure of the released gas upon the surface of the more or less gas free oil forces it through the openings 19 into the small tubing, which conducts it to the surface, discharging through the holes at the top of the small tubing into the device 16, from whence it flows to storage. The gas released by the agitation flows to the surface through the outer tubing, and back into the space between the casing 10 and the outer tubing 12, or away from the well, through the pipe 24 and valve 25 according to the adjustment of the valves 23 and 25. That gas flowing back into the well can have its pressure regulated, either by hand or automatically, by means of the valves 23, to maintain the level of the oil gas mixture delivered by the well below the perforations 11 of the casing, to allow the gas to flow back into the gas cap of the formation for self repressuring.

It should be noted that in the operation of the apparatus outlined, the delivery to the surface is independent of the pressure in the casing, and the amount of gas free oil withdrawn can be adjusted to suit the geological conditions for greatest recovery of the oil and most efficient utilization of the reservoir energy. It is to be understood, of course, that the various parts of the device are to be set at such a depth with relation to the oil producing formation that proper flow differentials are maintained. The gas withdrawn from the oil may all be returned to the well, or returned to the formation gas cap through another well. Since the pressure of the gas in the tubing 12 is higher than that of the gas cap, this separated gas may be delivered without recompression to the gas cap through the casing 10 or through another well, by proper regulation of valves 23 and 25.

In the event that it is not desired or considered necessary to bring the gas to the surface, the construction of Figure 2 may be employed. In this construction, the agitation chamber is installed in the eduction tube of a well, with the standing valve 13 and the gas valves 26 at the bottom and top respectively. Instead of a reciprocating tube extending to the surface, the tubing may extend only to above the gas valve, and sucker rods 27 being used for the remainder of the length of the well. The construction at the top of the well would then be the conventional arrangement for pumping wells. It is apparent that in this construction, the gas separates from the mixture of oil and gas, and escapes through valves 26 to the space between the casing and the eduction tube 12. If, in any event, it is desired to bring the gas to the surface for control, the eduction tube can be surrounded with a gas tube, to allow gas to be brought to the surface, and disposed of as desired, independently of the casing pressure.

In order to eliminate the string of tubing utilized in the preceding construction, that illustrated in Figure 4 may be used. In this construction, the casing itself is used as an agitation and separation chamber.

In Figure 4 a packer 32 with a standing valve 38 is used between the bottom of the casing and the section in which the agitator operates. This packer 32 above the perforations 11, which are opposite the producing formation, allows flow of oil and gas in an upward direction. It prevents reverse flow; and, if it is desired to repressure the well above the producing formation, agitation by means of the agitators 18 will release gas from the gas and oil which may flow into the formation above the producing formation through perforations 11'. Inasmuch as the standing valve in 32 permits passage of oil in an upward direction only, the pressure in the upper part of the casing can be much higher than that existing in the formation, after agitation is long enough continued. Of course, in order that more oil be brought into the upper part of the casing, the pressure in the upper part of the casing may have to be lowered somewhat, which can conveniently be done by withdrawing some of the gas through the valve 33 in the casinghead.

As a variation on these constructions, I also propose that shown in Figure 3. In Figure 3, the oil gas mixture flows to the surface through the eduction tube 12 in the usual manner for flowing wells. The oil flows from the tubinghead 21 to an agitator 37 through a check valve 45, preventing reverse flow. The agitator 37 contains paddles or any suitable agitator elements 38 driven by any suitable means 39. Above the agitator 37 is shown a separation chamber 40, in which the oil and the gas released by agitation separate. It is to be understood, of course, that the separation chamber may be separate from the agitator. From the separation chamber 40 an oil pipe 41 and a gas pipe 42 lead, one to any convenient place for further treatment of the oil, the other to the casinghead 20 of the well, and to another well. The gas delivered to the casinghead 20 may be used to repressure low pressure formations through which the well passes, while that delivered to another well may be used for repressuring at a point where the pressure is lower than that of the separated gas from the producing well. Whether the separated gas goes to the producing well or to another well, and how much to each, and at what pressure, can be determined by the valves 43 and 44.

It will be noted that all of the forms shown and described can be utilized where there is no oil flow. This is desirable when oil flow can be maintained only by pressure of the gas, or where legislative enactments limit the flow to a certain number of hours daily. During periods of enforced idleness, the gas oil mixture in the casing can be agitated and the gas allowed to percolate back into the formation, thus allowing increased production during periods of flow.

In several of the forms, the pressure of the gas in the casing is independent of the pressure of the gas in the separation chambers. This makes for more efficient control of the repressuring operation, and readily adapts the apparatus for adjustment to obtain the maximum yield from a formation without detrimental effect upon the underground deposits.

I wish it clearly understood that the devices shown all have a pressure at either the casinghead or the gas tubinghead in excess of that necessarily produced by the formation gas cap. This makes practical the use of my device for repressuring through intake wells, as well as repressuring the well producing the oil, and, in fact, some of the gas may be used for self-repressuring and some for repressuring adjacent wells.

Having fully described my invention, with specific embodiments thereof for purposes of illustration, I wish it understood that the scope of the invention is to be interpreted from the following claims.

I claim:

1. The method of operating a well producing gas charged oil which includes conducting said gas charged oil through agitating means, positively driving said agitating means from a source of energy independent of the oil flow to render the extent of agitation and the resultant release of gas from each unit volume of oil passed through said agitating means independent of the rate of oil flow, separating the released gas, flowing said gas to an oil bearing formation and delivering the oil for appropriate disposal.

2. The method of operating a well flowing gas charged oil into the casing thereof which includes conducting said gas charged oil through agitating means, positively driving said agitating means from a source of energy independent of the oil flow to render the extent of agitation and the resultant release of gas from each unit volume of oil passed through said agitating means independent of the rate of oil flow, separating the released gas, discharging the thus separated gas into the gas cap of the oil bearing formation, and delivering the oil to the surface of the ground.

3. The method of operating a well flowing gas charged oil into the eduction tube thereof which includes directing such gas charged oil within the eduction tube against agitating means, positively driving said agitating means from a source of energy independent of the oil flow to render the extent of agitation and the resultant release of gas from each volume of gas charged oil passed through said agitating means independent of the rate of oil flow, separating within the eduction tube at least a portion of the gas so released, discharging such released gas into the well external the eduction tube, and delivering the oil to the ground surface.

JOHN A. ZUBLIN.